United States Patent [19]

Poulin

[11] Patent Number: 4,698,046
[45] Date of Patent: Oct. 6, 1987

[54] TRANSMISSION DEVICE IN PARTICULAR FOR A DRIVING WHEEL OF A MOTOR VEHICLE

[75] Inventor: Bernard Poulin, Conflans Sainte Honorine, France

[73] Assignee: Glaenzer Spicer, Poissy, France

[21] Appl. No.: 805,585

[22] Filed: Dec. 9, 1985

Related U.S. Application Data

[63] Continuation of Ser. No. 563,929, Dec. 21, 1983, abandoned.

[30] Foreign Application Priority Data

Dec. 24, 1982 [FR] France .................. 82 21773

[51] Int. Cl.[4] .................. F16D 1/06; C21D 1/06
[52] U.S. Cl. .................. 464/115; 148/16.5; 464/183
[58] Field of Search .................. 148/16.5, 16.6; 228/231; 464/111, 113, 114, 115, 140, 183, 905

[56] References Cited

U.S. PATENT DOCUMENTS

| | | | |
|---|---|---|---|
| 1,508,897 | 9/1924 | Seaholm et al. | 464/113 X |
| 2,003,508 | 6/1935 | Jencick | 464/122 X |
| 2,898,749 | 8/1959 | Parkman | 464/115 |
| 2,952,999 | 9/1960 | Glover | 464/183 X |
| 4,068,499 | 1/1978 | Sharp | 464/115 |
| 4,154,628 | 5/1979 | Dudek et al. | 148/16.5 |
| 4,173,501 | 11/1979 | Hildebrandt et al. | 148/16.5 |
| 4,279,528 | 7/1981 | Mangiavacchi et al. | 464/111 X |
| 4,318,282 | 3/1982 | Orain | 464/115 X |
| 4,421,196 | 12/1983 | Orain | 464/115 X |

FOREIGN PATENT DOCUMENTS

| | | |
|---|---|---|
| 61368 | 9/1982 | European Pat. Off. . |
| 2345522 | 10/1977 | France . |
| 2429928 | 1/1980 | France . |
| 2472111 | 6/1981 | France . |

OTHER PUBLICATIONS

*Steel*, "Carburizing–Martempering", Oct. 3, 1949, p. 72, J. J. Ebner.

*Primary Examiner*—Daniel P. Stodola
*Attorney, Agent, or Firm*—Wenderoth, Lind & Ponack

[57] ABSTRACT

A transmission includes two constant-speed joints interconnected by a tubular shaft. The tubular shaft is made from a steel for thermochemical treatment and is welded at at least one of its ends to an element of an adjacent constant-speed joint before the thermochemical treatment of the latter. The two elements are subjected after their assembly to the same cementation or carbonitriding treatment.

16 Claims, 7 Drawing Figures

TRANSMISSION DEVICE IN PARTICULAR FOR A DRIVING WHEEL OF A MOTOR VEHICLE

This application is a continuation of now abandoned application Ser. No. 563,929, filed Dec. 21, 1983, now abandoned.

BACKGROUND OF THE INVENTION

The present invention relates to transmission devices employed in particular in motor vehicles between the engine unit and front driving wheels and of the type comprising two constant-speed joints, at least one of which is slidable, interconnected by a transmission shaft.

In such an arrangement, the intermediate transmission shaft is connected at each end with an element of the adjacent joint. Thus, if the two constant-speed joints are of the tripod type, one being fixed and the other slidable, the transmission shaft is connected at one end to the tulip element of the fixed joint and is connected at its other end to the tripod element of the slidable joint.

There are used as intermediate transmission shafts solid shafts which have the drawback of being heavy and, owing to their weight and their resilience, of transmitting and even amplifying the various vibrations produced by the engine unit.

Tubular transmission shafts of mild steel have also been used which have at each end inner splines or serrations and connected to the elements of the adjacent joints by the shrinkage of their serrated end regions onto the externally splined or serrated shaft sections and extending said elements. According to the type of steel employed, the outside diameter and the thickness of these tubular shafts are relatively great and their weight is higher than that of a solid bar capable of transmitting the same torque. Further, such a tubular transmission shaft does not solve in a satisfactory manner the problem of the transmission or amplification of certain vibrations.

There is known from French Pat. No. FR-A-2 345 522 an arrangement in which a tubular transmission shaft is welded at its end to a universal joint yoke. This welded assembly is then heat treated by a treatment comprising heating followed by quenching and tempering, the purpose of which is to improve the the structural resistance characteristics of the parts and to remove the residual stresses resulting from the welding.

An assembly treated in this way is unsuitable in the particular application envisaged where the transmission shaft carries, at at least one of its ends, a constant-speed joint element defining raceways for rollers or balls, which raceways being therefore called upon to support contact pressures or Hertzian pressure of high value, for example of the order of 400 kg/mm$^2$. Usually, this element of the joint is therefore subjected, before it is mounted on the transmission shaft, to a thermochemical treatment adapted to impart thereto the desired properties of surface hardness. Moreover, it is known that this type of treatment can, under certain conditions, have a negative effect on the performance and strength of the parts subjected thereto and it has even been necessary, in order to overcome this drawback, to provide untreated regions, ie. to mask certain parts of these parts so as to prevent them from coming into contact with the treatment gas.

SUMMARY OF THE INVENTION

An object of the present invention is to provide a transmission of the aforementioned type which is, for given properties of resistance, lighter than the known transmissions and more effective in the elimination of vibrations.

The invention therefore provides a transmission device, in particular for a motor vehicle, of the type comprising two constant-speed joints interconnected by a tubular intermediate shaft, said shaft being fixed at at least one of its ends to an element of the adjacent joint which defines raceways and is made from a high grade steel capable of undergoing a thermochemical treatment imparting thereto high surface hardness, wherein the tubular shaft which is also made from a high grade steel for being subjected to a thermochemical treatment, is welded, in the known manner, to said element before the thermochemical treatment of said element, the assembly formed by the shaft and the or each element having undergone, after assembly, the same thermochemical treatment imparting thereto high surface hardness.

According to other features:

the tubular shaft and the or each joint element to which it is welded define a closed cavity;

the tubular shaft and the or each joint element to which it is welded define a quasi-closed cavity;

the joint element has a skirt to which the adjacent end of the intermediate shaft is welded;

this skirt has a diameter and a wall thickness corresponding to those of the adjacent end portion of the tubular shaft;

the shaft has a narrowed portion at at least one of its ends;

the skirt has a flared portion.

Another object of the invention is to provide a method for producing such a device which comprises assembling by welding a tubular shaft and at least one constant-speed joint element, which are made from the same grade of steel having high properties for a thermochemical treatment, or closely similar grades, then subjecting the assembly to a thermochemical treatment which imparts thereto a high surface hardness.

BRIEF DESCRIPTION OF THE DRAWINGS

A better understanding of the invention will be had from the following description which is given solely by way of example with reference to the accompanying drawings, in which.

DETAILED DESCRIPTION OF THE INVENTION

Figure 1:
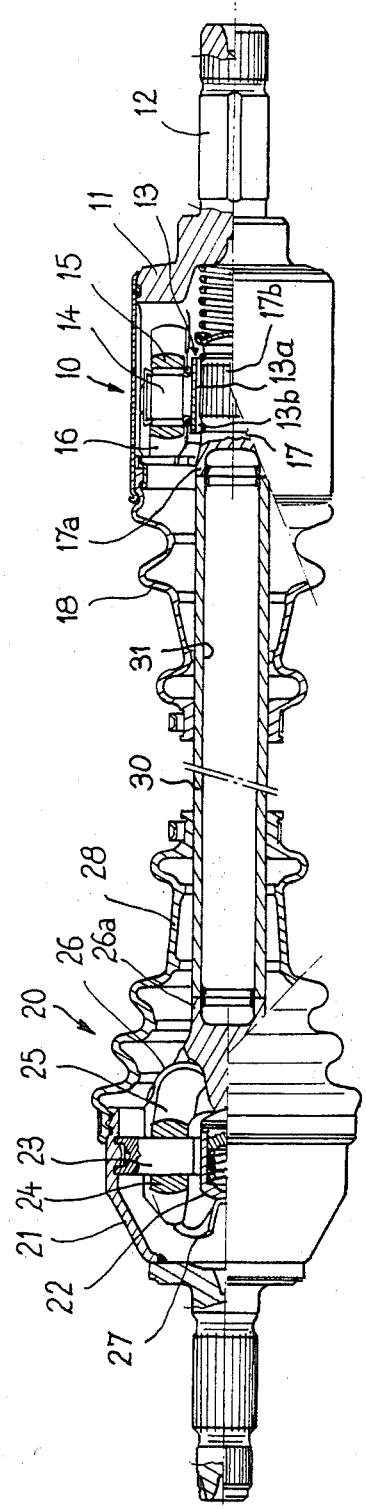
FIG. 1 is a longitudinal sectional view of a transmission device according to the invention.

FIG. 1 shows a transmission device, in particular for the lateral transmission of a motor vehicle, comprising two constant-speed universal joints 10, 20 which are interconnected by a transmission shaft 30.

The first joint 10, which is of the slidable type, comprises a tulip element 11 connected to a shaft section 12 adapted to be driven by an engine unit, and a tripod element 13 carrying three trunnions 14 spaced 120° apart and on which are rotatively and slidably mounted spherical rollers 15 received in rectilinear raceways 16 provided in the tulip element. In this embodiment, the tripod element has a hub provided in its inner peripheral portion with splines or serrations 13b which are engaged with corresponding splines or serrations 17b of an end element 17 which is fixed by welding to the adjacent end of the connecting shaft. For this purpose, the end element has, on the surface thereof facing the shaft 30, an annular skirt 17a whose diameter and wall thickness correspond to those of the tube constituting the shaft 30.

The second constant-speed universal joint 20 is a fixed joint having a tripod element and a bowl or bell element 21 adapted to be connected to the hub (not shown) of the wheel to be driven, this bowl element being connected to the tripod element 22 on the three trunnions 23 of which are mounted spherical rollers 24 received in raceways 25 defined by a tulip element 26. Means of known type including in particular a resiliently yieldable fastener 27 are provided for rendering this joint fixed, ie. without possibility of axial movement between the tripod element and the tulip element. The tulip element 26 terminates, at its end adjacent the connecting shaft, in a skirt 26a whose diameter and wall thickness correspond to those of the shaft 30.

The assembly is completed in the conventional manner by sealing gaiters 18 and 28.

According to the invention, the material of the tubular connecting shaft 30 is a steel for receiving a thermochemical treatment and preferably a steel identical or close to that of the end element 17 and the tulip element 26. It concerns a high grade steel, for example a chromium-molybdenum steel of the type French standard 25 CD4 or 27 CD4 whose tensile strength may be of the order of 300 kg/mm$^2$ and which, after treatment, has a Rockwell hardness C equal to or higher than 62.

Also according to the invention, the assembly by welding of the tube 30 and the end element 17 and the tulip element 26, is carried out before the heat treatment operation to which the tulip elements must be subjected and it is the welded assembly formed by the shaft 30, the end element 17 and the tulip element 26 which is subjected to this thermochemical treatment, for example cementation or carbonitriding followed by quenching, such a treatment being known per se and consequently requiring no detailed description.

The welds themselves may be achieved by friction, electronic bombardment or any other suitable process.

It is important to note that the tubular shaft 30 defines with the two elements 17, 26 to which it is fixed a closed cavity 31, so that during the thermochemical treatment, the treatment gas does not enter this cavity and does not affect the metal inside the tube. This feature is all the more important as the thickness of the tube 30 is smaller, for example less than 1.5 mm.

The device and method just described result in a very important series of advantages over the various known solutions and, contrary to what might have been feared, the cementation or carbonitriding treatment has no harmful effect on the structural strength of the assembly or on its performance.

By employing a steel having high properties, it is possible to use a tube of small outside diameter (for example 27 mm) and of small wall thickness (3 or 3.5 mm) which is nonetheless capable of transmitting the torque that the joints are capable of withstanding (of the order of 300 m.daN in the considered example).

With respect to a conventional arrangement (bar having a diameter of 24 mm or an inserted tube of 35-27 mm, these two dimensions corresponding to the outside diameter and inside diameter respectively of tube), the saving in weight achieved in using a 27-30 mm connecting tube is of the order of 0.7 kg for a total weight of the connecting assembly formed by the tube and its two end elements, of the order of 2.4 kg, which is considerable.

Tests carried out both on the bench and on the vehicle show that the dynamic performance of a transmission constructed in this way is excellent and in particular there is a very substantial improvement in the elimination of the various vibrations produced by the engine unit.

Figure 2:
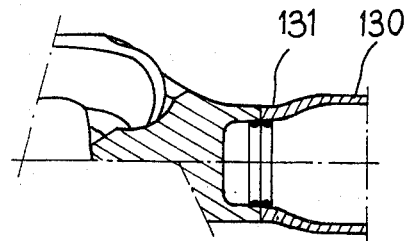
FIGS. 2 to 7 are partial sectional views of different embodiments of the connection between the ends of the shaft and the adjacent constant-speed joints.
Figure 3:
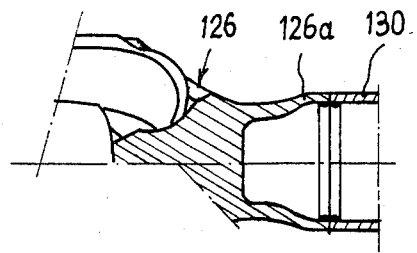

In the embodiment illustrated in FIG. 2, there is employed a tube 130 of larger diameter and a thinner wall thickness, for example less than or equal to 1.5 mm, which configuration may be rendered necessary by the operating characteristics of the transmission. The connection between the tube and the adjacent elements may be either through a narrowed portion 131 of the tube (FIG. 2) or through a flared portion 126a produced as a last cold-forming operation on said adjacent element, namely the tulip element 126 of the fixed joint (FIG. 3).

Figure 4:
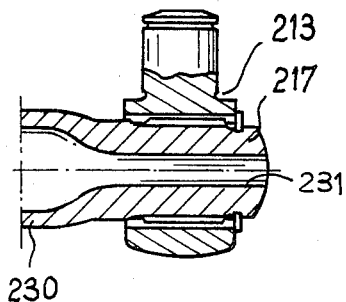

In another embodiment, the splined end element 217 receiving the tripod element 213 of the slidable joint can be in one piece with the tubular element 230 (FIG. 4). In this case, either the corresponding end of the tube is closed or virtually closed, ie. defines a passage 231 of only small section and relatively great length, so as to prevent a circulation of the treatment gas.

Figure 5:
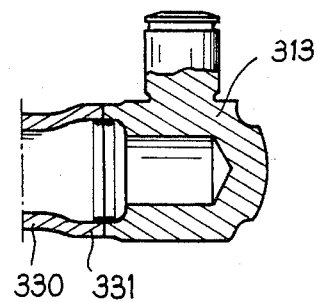

There may also be employed, as shown in FIG. 5, a direct connection by the welding of the tripod element 313 of the slidable joint to the tubular shaft 230 whose end portion is, if desired, flared at 331. In this case, each of the two ends of the shaft is closed by an active element of the adjacent constant-speed joint having rolling surfaces which must possess a high surface hardness.

Figure 6:
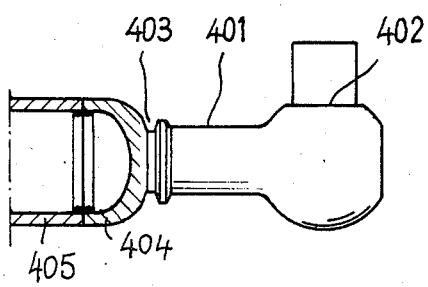

FIG. 6 shows an embodiment derived from that of FIG. 5, in which the shaft section 401 connected to the tripod element 402 defines in its part of reduced diameter a groove 403 for fixing the entrance portion of a sealing gaiter (not shown). The shaft 401 further comprises a flared end portion 404 welded to the shaft 405.

Figure 7:
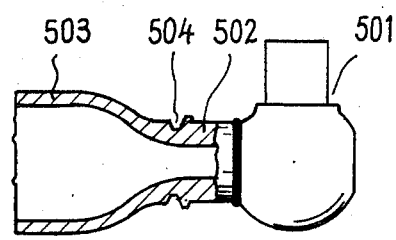

FIG. 7 shows another embodiment in which a tripod element 501 is welded to one end 502 of reduced diameter of the hollow shaft 503, the latter defining in this part of reduced diameter a groove 504 for fixing the entrance portion of a sealing gaiter (not shown). This arrangement is particularly advantageous for a good fixing of the gaiter and an easy mobility of the joint.

What is claimed is:

1. A transmission device for use between an engine unit and front driving wheels of a motor vehicle, said device comprising:

two constant-speed joints, at least a first of said joints including a first element defining raceways for rolling members of said joint, said first element being formed of a high grade steel capable of undergoing a thermochemical treatment imparting to said element a high surface hardness;

a hollow tubular shaft connected to said two joints and including a first end welded to said first element of said first joint, said shaft being formed of a high grade steel capable of undergoing a thermochemical treatment substantially identical to that to which said first element is capable of being subjected and imparting to said shaft a high surface hardness; and the entire assembly of said first element, said shaft and the weld therebetween being subjected to a cementation or carbonitriding thermochemical treatment followed by quenching, to surface harden said assembly such that surfaces of said assembly, including said weld, have a high surface hardness sufficient to withstand pressures exerted on said raceways by the rolling members of said joint.

2. A device as claimed in claim 1, wherein a second of said joints includes a second element formed of a high grade steel capable of undergoing a thermochemical treatment substantially identical to that to which said shaft is capable of being subjected and imparting to said second element a high surface hardness, said shaft includes a second end welded to said second element, and the complete assembly of said first and second elements, said shaft and the respective welds therebetween being subjected to a cementation or carbonitriding thermochemical treatment followed by quenching, to surface harden said assembly such that surfaces of said assembly, including said welds, have a high surface hardness sufficient to withstand pressures exerted on said raceways by the rolling members of said joint.

3. A device as claimed in claim 1, wherein said assembly defines a closed interior cavity.

4. A device as claimed in claim 1, wherein said tubular shaft has a wall thickness less than 1.5 mm.

5. A device as claimed in claim 1, wherein said assembly defines a virtually closed interior cavity.

6. A device as claimed in claim 1, wherein said first element of said first joint includes a skirt, and said first end portion of said tubular shaft is welded to said skirt.

7. A device as claimed in claim 6, wherein said skirt and said first end of said tubular shaft both have the same diameter and wall thickness.

8. A device as claimed in claim 7, wherein said shaft has a narrowed portion at at least one of its ends.

9. A device as claimed in claim 7, wherein said skirt has a flared portion.

10. A device as claimed in claim 1, wherein each of said two joints includes a tripod element, and at least one of said joints is slidable.

11. A device as claimed in claim 1, wherein said tubular shaft and said first element are made from chromium-molybdenum steel.

12. A device as claimed in claim 11, wherein said chromium-molybdenum steel is of type French Standard 25 CD4.

13. A device as claimed in claim 11, wherein said chromium-molybdenum steel is of type French Standard 27 CD4.

14. A device as claimed in claim 1, wherein said first element welded to said shaft has a shaft section of reduced diameter, and a groove is defined in said shaft section for attachment of an entrance portion of a sealing gaiter.

15. A device as claimed in claim 1, wherein said first end of said shaft has a reduced diameter having defined therein a groove for attachment of the entrance portion of a sealing gaiter.

16. A device as claimed in claim 1, further comprising means for isolating the interior of said hollow tube, thereby preventing entrance therein of treatment gas during said thermochemical treatment.

* * * * *